Patented Mar. 20, 1951

2,545,872

UNITED STATES PATENT OFFICE 2,545,872

POLYAZO DYESTUFFS

Werner Bossard, Riehen, and Marcel Reding, Basel, Switzerland, assignors to J. R. Geigy A. G., Basel, Switzerland, a Swiss firm No Drawing. Application October 14, 1948, Serial No. 54,565. In Switzerland May 16, 1945

5 Claims. (Cl. 260—159)

This application is a continuation-in-part of the original application Serial No. 669,579 of May 14, 1946, now abandoned.

It has been found that valuable new metallisable polyazo dyestuffs are obtained by coupling one mol of a tetrazotized diamino compound of the general formula

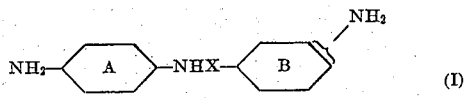

wherein X stands for CO— or CONH— and the benzene rings A and B may contain still further substituents usual in azo dyestuffs, except that no hydroxyl groups or substituents convertible thereinto, such as, e. g., alkoxy groups, may be present in ortho position to the diazo groups, in any order of succession, on the one hand, with one mol of a monoazo dyestuff of the general formula

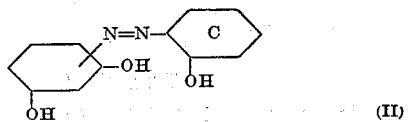

wherein the benzene nucleus C may carry still further substituents usual in azo dyestuffs, and, on the other hand, with one mol of 3-methyl-5-pyrazolone of the formula

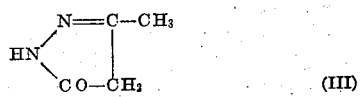

the components being selected in such a manner that the final dyestuffs contain at least one sulfonic acid group.

The same dyestuffs may also be obtained by coupling diazotised nitro compounds of the general formula

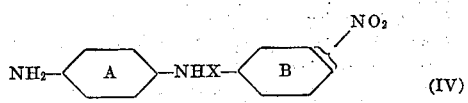

and wherein the above conditions hold with respect to A and B as well as to the hydroxyl group or any substituent convertible thereinto, either with one mol of a copperable resorcinol monoazo dyestuff corresponding to the above Formula II or with one mol of 3-methyl-5-pyrazolone of the above Formula III, converting the nitro group into the amino group, diazotising the resulting aminoazo dyestuff and combining the same with one mol of the coupling component III or II respectively, thus yielding the unsymmetrical polyazo dyestuff.

As diamino or nitro amino compounds corresponding to the above Formulae I and IV are suitable for instance: m- or p-aminobenzoyl-p-phenylene-diamine, their sulfonic acids or carboxylic acids, m- or p-nitrobenzoyl-p-phenylenediamine, their sulfonic acids or carboxylic acids, 4.3'- or 4.4'-diaminodiphenylurea and their alkyl-substitution products and the like. Although m'-p-diamines give good dyestuffs as regards the bridging member, nonetheless we prefer p.p'-diamines because they generally yield better dyestuffs.

As diazo components of the resorcinol monoazo dyestuff corresponding to the above Formula II may be enumerated for example diazo compounds of the 2-amino-1-hydroxy-benzene series, such as 2-amino-1-hydroxy-benzene, 4-chloro-2-amino-1-hydroxy-benzene, 4-, 5- or 6-methyl-2-amino-1-hydroxy-benzene, 2-amino-1-hydroxy-benzene-4-sulfonic acid or -carboxylic acid, 2-amino-1-hydroxy-benzene-4-sulfonic acid amide, 4- or 6-chloro-2-amino-1-hydroxy-benzene-sulfonic acid, 4- or 6-nitro-2-amino-1-hydroxy-benzene-sulfonic acid, 4- or 6-acetylamino- or -benzoylamino-2-amino-1-hydroxy-benzene-sulfonic acid, 4.4'-dihydroxy-3-aminobenzene-sulfonic acid-anilide-3'-carboxylic acid, 4.4'-dihydroxy-3-aminobenzophenone-3'-carboxylic acid and the like.

Dyestuffs from tetrazotised diamines of Formula I, further substituted as desired, together with the coupling components according to the invention generally yield coppered dyeings on cellulose fibres with good fastness to light and to wet conditions. However, that group of dyestuffs containing no hydroxyl group nor substituents convertible thereinto in the ortho position to the azo groups in the benzene rings A and B yield dyeings which possess in addition good fastness to acids and to perspiration.

The new polyazo dyestuffs have a good affinity to natural or regenerated cellulosic fibres, giving yellowish-brown to reddish-brown dyeings, the shades of which are only slightly changed by after-treatment with copper compounds according to any one of the known methods, whereas the light-fastness thereof as well as their fastness properties in the moist state are substantially improved.

The present invention will now be illustrated by the following examples, without being limited thereto. The parts are by weight.

Example 1

24.2 parts of 4.4'-diaminodiphenyl urea are tetrazotised with 13.8 parts of sodium nitrite in the presence of 45 parts of hydrochloric acid and then combined in a slightly acetic acid suspension with an aqueous solution of 31 parts of the monoazo dyestuff obtained by coupling diazotised 2-amino-1-hydroxy-benzene-4-sulfonic acid with resorcinol. As soon as any trace of tetrazo-diphenyl urea has disappeared, there is coupled in the presence of sodium bicarbonate with a neutral, aqueous solution of 9.8 parts of 3-methyl-5-pyrazolone. After 12 hours this is filtered and dried. The resulting trisazo dyestuff which is a dark powder dissolves in water with a brown coloration and in concentrated sulfuric acid with an orange-red coloration. It dyes cellulosic fibres in yellow-brown shades which, on after-treatment with copper compounds, only slightly change, whereas their fastness properties will substantially be improved.

Dyestuffs having similar properties will be obtained, if, instead of the monoazo dyestuff from diazotised 2-amino-1-hydroxy-benzene-4-sulfonic acid, coupled with resorcinol, there is used a monoazo dyestuff obtainable by coupling resorcinol with diazotised 2-amino-1-hydroxy-benzene-4-carboxylic acid, 4-nitro-2-amino-1-hydroxy-benzene-6-sulfonic acid, 6-nitro-2-amino-1-hydroxy-benzene-4-sulfonic acid, 4-chloro-2-amino-1-hydroxy-benzene-6-sulfonic acid, 6-chloro-2-amino-1-hydroxy-benzene-4-sulfonic acid, 4-acetylamino- or 4-benzoylamino-2-amino-1-hydroxy-benzene-6-sulfonic acid, 6-acetylamino- or 6-benzoylamino-2-amino-1-hydroxy-benzene-4-sulfonic acid.

Example 2

22.7 parts of 1-(4'-aminobenzoylamino)-4-aminobenzene are tetrazotised with 13.8 parts of sodium nitrite in the conventional manner and coupled in a slightly acetic acid solution with a litmus-acid aqueous solution of 31 parts of the monoazo dyestuff from diazotised 2-amino-1-hydroxy-benzene-4-sulfonic acid and resorcinol. After several hours the formation of the intermediate product is complete. Then there is first treated with a neutral solution of 9.8 parts of 3-methyl-5-pyrazolone and subsequently 10 parts of sodium bicarbonate in 200 parts of water are gradually added. After completion of the coupling the finished trisazo dyestuff is filtered off and dried. It constitutes a dark powder which is soluble in water with a brown coloration and in concentrated sulfuric acid with a yellow-brown coloration and produces on fibres from natural or regenerated cellulose yellowish-brown dyeings, which, on after-treatment with copper compounds in any known manner, possess very good fastness properties.

Dyestuffs with similar properties will be obtained by using instead of the monoazo dyestuff from diazotised 2-amino-1-hydroxy-benzene-4-sulfonic acid coupled with resorcinol, a monoazo dyestuff obtainable by coupling resorcinol with diazotised 2-amino-1-hydroxy-benzene-4-carboxylic acid, 4-nitro-2-amino-1-hydroxy-benzene-6-sulfonic acid, 6-nitro-2-amino-1-hydroxy-benzene-4-sulfonic acid, 4-chloro-2-amino-1-hydroxy-benzene-6-sulfonic acid, 6-chloro-2-amino-1-hydroxy-benzene-4-sulfonic acid, 4-acetylamino- or 4-benzoylamino-2-amino-1-hydroxy-benzene-6-sulfonic acid, 6-acetyl-amino- or 6-benzoylamino-2-amino-1-hydroxy-benzene-4-sulfonic acid.

Example 3

33.7 parts of 1-(4'-nitrobenzoylamino)-4-aminobenzene-3-sulfonic acid are diazotised in a conventional manner with 6.9 parts of sodium nitrite and coupled with 9.8 parts of 3-methyl-5-pyrazolone in the presence of an excess of sodium carbonate. Then there is heated to 50° C., 12 parts of sodium sulfide in form of a 15% solution are poured thereinto and, after complete reduction, the aminoazo dyestuff precipitated by means of hydrochloric acid is filtered off. Then there is mixed with 7 parts of sodium nitrite and diazotised in the cold by adding quickly 35 parts of concentrated hydrochloric acid. After several hours the diazonium compound, which has been filtered off and suspended in 400 parts of water, is combined in a weakly acetic acid solution with 30.9 parts of the monoazo dyestuff obtainable by coupling diazotised 2-amino-1-hydroxy-benzene-4-sulfonic acid amide with resorcinol. The coupling is accelerated by adding dropwise 10 parts of sodium bicarbonate in 200 parts of water. After some standing the finished trisazo-dyestuff is precipitated from an alkaline solution by means of sodium chloride, filtered off and dried. The new dyestuff is a dark powder dissolving in water and in concentrated sulfuric acid with a brown coloration and dyeing cellulosic fibres in yellow-brown shades which, after having been treated with copper sulfate, possess very good fastness properties.

By replacing in the above example the monoazo dyestuff obtainable by coupling diazotised 2-amino-1-hydroxy-benzene-4-sulfonic acid amide with resorcinol by a monoazo dyestuff which is obtainable by coupling resorcinol with diazotised 4-methyl-2-amino-1-hydroxy-benzene, 4-chloro-2-amino-1-hydroxy-benzene or 4-nitro-2-amino-1-hydroxy-benzene, dyestuffs with similar properties will be obtained.

Example 4

22.7 parts of 1-(3'-aminobenzoylamino)-4-aminobenzene are tetrazotised with 13.8 parts of sodium nitrite and treated with a litmus-acid solution of 34.5 parts of the monoazo dyestuff from diazotised 6-chloro-2-amino-1-hydroxy-benzene-4-sulfonic acid and resorcinol with 15 parts of sodium acetate. The coupling is maintained slightly acid to litmus by adding dropwise a dilute sodium carbonate solution. As soon as the intermediate product has completely been formed, there is coupled with 9.8 parts of 3-methyl-5-pyrazolone in the presence of sodium bicarbonate. The resulting trisazo dyestuff is filtered off after 12 hours and dried. It is a dark powder dissolving in water and in concentrated sulfuric acid with a yellow-brown coloration. It dyes cotton and fibres from regenerated cellulose in yellow-brown shades which, when after-treated with copper salts, possess excellent fastness properties.

Dyestuffs having similar properties can be obtained when using, instead of 1-(3'-aminobenzoylamino)-4-aminobenzene the 1-(3'-amino-4'-methyl-benzoylamino)-4-aminobenzene, 1-(3'-amino-4'-chloro-benzoylamino)-4-aminobenzene, 1-(4'-aminobenzoylamino)-2-methyl-4-aminobenzene, 1-(4'-aminobenzoylamino)-2-chloro-4-aminobenzene, 1-(3'-amino-4'-methyl-benzoylamino)-2-methyl-4-aminobenzene or the 1-(3'-aminobenzoylamino)-4-aminobenzene-3- carboxylic acid, 4.4'-diamino-2.2'-dimethyl-diphenyl-urea, 4.4' - diamino-diphenyl-urea-3.3'-disulfonic acid and, instead of the monoazo dyestuff from diazotised 6-chloro-2-amino-1-hydroxy-benzene-4-sulfonic acid and resorcinol, any other resorcinol-monoazo dyestuff mentioned in Example 1.

In the following table further dyestuffs which may be produced according to the present invention will be mentioned, the azo component I being shown in the first column and the coupling component II being enumerated in the second column. As coupling component III there is always used 3-methyl-5-pyrazolone.

| tetrazo compound from— | monoazo dyestuff from resorcinol and diazotized | Shade of the copper-containing dyeing on cellulosic fibres |
|---|---|---|
| 1-(3'-aminobenzoylamino)-4-amino-benzene-3-sulfonic acid. | 2-amino-1-hydroxy-benzene-4-sulfonic acid amide | yellowish-brown. |
| 1-(4'-aminobenzoylamino)-4-amino-benzene-3-sulfonic acid. | ......do.......... | Do. |
| 1-(4'-aminobenzoylamino)-4-amino-benzene-3-carboxylic acid. | 2-amino-1-hydroxy-benzene-4-sulfonic acid | Do. |
| 1-(4'-aminobenzoylamino)-4-aminobenzene | 4.4'-dihydroxy-3-aminobenzophenone-3'-carboxylic acid. | Do. |
| 4.4'-diaminodiphenyl-urea-3.3'-dicarboxylic acid | 2-amino-1-hydroxy-benzene-4-sulfonic acid | yellow-brown. |
| 4.3'-diaminodiphenyl-urea | ......do.......... | Do. |

What we claim is:

1. A polyazo dyestuff containing at least one sulfonic acid group and corresponding to the general formula:

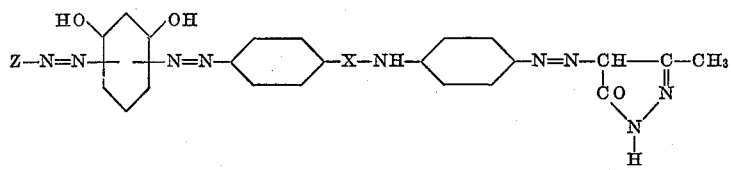

wherein X represents a member selected from the group consisting of CO and NH.CO, and ZN=N represents the radical of a diazotized o-hydroxyarylamine of the benzene series.

2. A polyazo dyestuff corresponding to the formula

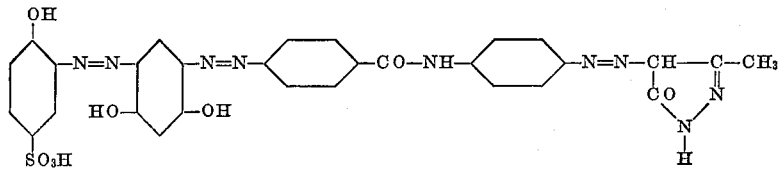

3. A polyazo dyestuff corresponding to the formula

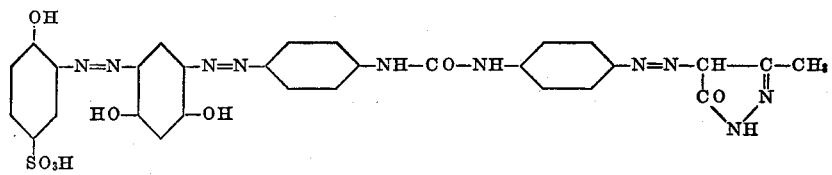

4. A polyazo dyestuff corresponding to the formula:

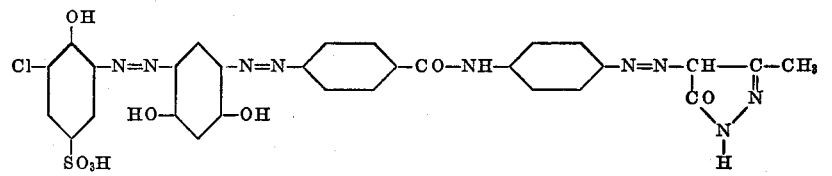

5. A polyazo dyestuff corresponding to the formula:

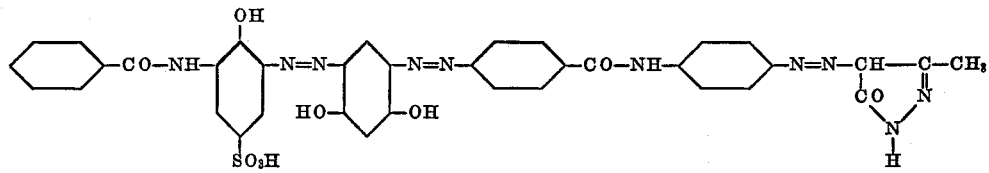

WERNER BOSSARD.
MARCEL REDING.

REFERENCES CITED

The following references are of record in the file of this patent:

UNITED STATES PATENTS

| Number | Name | Date |
|---|---|---|
| 2,155,001 | Schmid | Apr. 18, 1939 |
| 2,191,800 | Murphy et al. | Feb. 27, 1940 |
| 2,241,796 | Taube et al. | May 13, 1941 |
| 2,404,198 | Straub et al. | July 16, 1946 |
| 2,428,130 | Straub et al. | Sept. 30, 1947 |
| 2,459,467 | Straub et al. | Jan. 18, 1949 |